United States Patent Office 3,445,467
Patented May 20, 1969

3,445,467
BIPHENYL DIPHENYLALKANE AND DIPHENYL-
ETHER COMPOUNDS, AMINO - SUBSTITUTED
ON THE PHENYL RINGS
Albrecht Hueni and Ernst Schweizer, Basel, Switzerland,
and Dorothy Schroeder, Austin, Tex., assignors to Ciba
Corporation, New York, N.Y., a corporation of
Delaware
No Drawing. Filed May 18, 1965, Ser. No. 456,831
Claims priority, application Switzerland, May 25, 1964,
6,791/64; Apr. 13, 1965, 5,207/65
Int. Cl. C07d 51/42; A61k 27/00
U.S. Cl. 260—256.4
20 Claims

ABSTRACT OF THE DISCLOSURE

Compounds of the formula

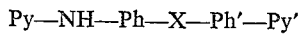

where Py and Py' each represents a pyrimidyl-(2) residue carrying in position 4 an amino group (Y) which is substituted by an aliphatic residue carrying an amino group and containing more than one carbon atom between the N-atoms; Ph and Ph' are phenylene residues and X represents a direct bond, oxygen or a lower divalent aliphatic hydrocarbon residue, and a process for the preparation thereof. The compounds are useful, inter alia, as antibacterial and anti-inflammatory agents.

---

The present invention relates to new pyrimidine compounds. More particularly it concerns the compounds of the formula

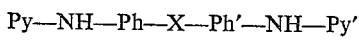

where Py and Py' each represents a pyrimidyl-(2) residue carrying in position 4 an amino group (Y) which is substituted by an aliphatic residue carrying an amino group and containing more than one carbon atom between the N-atoms; Ph and Ph' are phenylene residues and X represents a direct bond, oxygen or a lower divalent aliphatic hydrocarbon residue, and a process for the preparation thereof.

The aliphatic residues containing at least two carbon atoms, which carry an amino group, are above all lower alkylene residues whose carbon chain may be interrupted by hetero atoms such as oxygen, nitrogen or sulphur and/or which may be substituted by free hydroxyl or amino groups. These residues contain advantageously no more than 8 carbon atoms. Above all, there may be mentioned ethylene residues; straight or branched propylene, butylene, pentylene, hexylene or heptylene residures which may be linked at any desired different carbon atoms with the amino groups, especially ethylene, propylene-(1,3), propylene-(2,3), butylene-(2,4), butylene-(1,4), pentylene-(1,5), pentylene-(2,5), hexylene-(1,6) or hexylene-(2,6).

The amino group which substitutes the aforementioned aliphatic residue is unsubstituted or substituted. As substituents there may be mentioned, for example: lower aliphatic hydrocarbon residues whose carbon chain may be interrupted by hetero atoms such as oxygen, sulphur or nitrogen and/or which may be substituted by free hydroxyl groups and/or which may themselves be linked with the said aliphatic residue. Lower aliphatic hydrocarbon residues are above all saturated or mono-unsaturated alkyl, cycloalkyl or cycloalkyl-alkyl groups containing up to 8 carbon atoms. Groups of this kind that are interrupted by hetero atoms are above all oxa- or azaalkyl-, oxaalkylene-, azaalkylene- or oxacycloalkyl-alkyl radicals. There may be mentioned especially methyl, ethyl, allyl, propyl, iso-propyl groups; straight or branched butyl, pentyl, hexyl or heptyl residues which may be linked in any desired position; 3-oxabutyl, 3-oxapentyl, 3-oxaheptyl, 2-hydroxy-ethyl, 3-hydroxypropyl, butylene-(1,4), butylene-(1,5), hexylene-(1,5), hexylene-(1,6), hexylene-(2,5), heptylene-(1,7), heptylene-(2,7), heptylene-(2,6), 3-oxa-pentylene-(1,5), 3-aza-pentylene(1,5), 3-lower alkyl-3-aza-pentylene-(1,5) such as 3-methyl-3-aza-pentylene-(1,5), 3-hydroxy-lower alkyl-3-aza-pentylene-(1,5), such as 3-hydroxyethyl-3-aza-pentylene-(1,5), 3-oxa- or 3-aza-hexylene-(1,6), cyclopentyl- or cyclohexyl residues or cyclopentyl- or cyclohexyl-methyl or -ethyl residues. The amino group is advantageously secondary, more especially a lower alkylamino group, for example a methylamino or ethylamino or above all a propyl-, butyl- or pentylamino group in which advantageously the alkyl residues are not primary ones, for example an isopropylamino or secondary butylamino group. Particularly advantageous are tertiary amino groups, especially di-lower alkylamino groups such as dimethyl-, diethyl-, N-methyl-N-ethyl-, dipropyl- di-isopropyl-, dibutyl-, di-secondary butyl- or di-amyl-amino groups. When a substituent of the amino group is itself linked with the aliphatic residue, the substituent of the amino group in the 4-position of the pyrimidyl residue is, for example, an N-alkyl-pyrrolidyl-(2 or 3)-alkyl group, an N-alkyl-piperidyl-(2, 3 or 4) group, an N-alkyl-pyrrolidyl-(3) group or an N-alkyl-piperidyl-(2, 3 or 4)-alkyl group.

The two phenylene residues Ph and Ph' are preferably para-phenylene residues, though they may also be meta- or ortho-phenylene residues and may in this respect differ from each other.

A divalent aliphatic hydrocarbon residue X is, for example, a lower alkylene or alkylidene residue, for example methylene, ethylene, propylene or ethylidene, or a lower alkenylene residue, for example ethenylene.

The new compounds may further contain any desired substituents. Thus, the pyrimidyl residues may be substituted in 6-position for example, by halogen, lower alkyl, lower alkoxy, lower alkoxyalkyl or lower alkoxy-lower alkoxy and/or in 5-position, for example, by lower alkyl, lower alkoxy, or lower alkoxy-lower alkyl. The lower alkyl radicals in positions 5 and 6 may be linked together to form an alkylene residue, for example a butylene-(1,4) residue.

The phenylene residues may likewise be substituted, preferably by lower alkyl, lower alkoxy, halogen, trifluoromethyl, hydroxysulphonyl, aminosulphonyl, nitro or amino groups.

For the present purpose lower alkyls are especially those which contain 1 to 5 carbon atoms, such as methyl, ethyl, propyl or isopropyl residues, or linear or branched butyl or pentyl groups linked in any desired position. Lower alkoxy radicals are, for example, those which contain the afore-mentioned alkyl residues, especially methoxy, ethoxy or propoxy residues.

The lower alkoxy residues in the lower alkoxy-lower alkyl radicals are, for example, those mentioned above. The alkylene groups which link the oxygen atom with the pyrimidine nucleus are preferably alkylene residues containing 1 to 5, especially 1 to 3, carbon atoms, such as methylene residues, or ethylene, propylene, butylene or pentylene residues linked in any desired position. Lower alkoxy-lower alkyls are especially residues of the formula $RO-(CH_2)_n$, where R represents an alkyl radical containing 1 to 3 carbon atoms, and $n=1$, 2 or 3.

The alkoxy groups in the lower alkoxy-lower alkoxy groups are, for example, those mentioned above. The alkylene radical which links these alkoxy groups with the oxygen atom attached to the pyrimidine nucleus contains between the alkoxy group and the said oxygen atom at least two carbon atoms and contains preferably 2 to 5 carbon atoms; it is above all 1,2-ethylene, or 1,2-, or 1,3-propylene, or a linear or branched butylene or pentylene residue which is linked in any desired position and separates the vicinal oxygen atoms by at least two carbon atoms.

Suitable halogen atoms are especially bromine, chlorine or fluorine.

The new compounds possess valuable pharmacological properties. Above all, they act against bacteria such as tubercle bacilli, and primarily against protozoae, especially plasmodiae, for example in the mouse, and against piroplasms such as babesiae, babesiellae and theileriae. They act also against plasmodiae that have proved to be resistant towards known antimalaria medicamentas. The new compounds further have an antiinflammatory effect. The new compounds may therefore be used pharmacologically on animals or as medicaments, for example for the treatment of malaria, babesiasis, theileriasis, anapplasomsis and other infections, and also for treating diverse inflammatory conditions. They can also be used as animal fodder or as additives to animal fodder. They are also valuable intermediates for the manufacture of other compounds constituting valuable medicaments.

Of special value, above all insofar as their action against plasmodiae and babesiae is concerned, and as antiinflammatory substances are the compounds of the formula

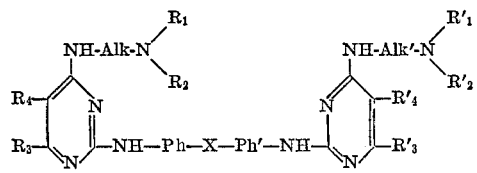

where Ph, X and Ph' have the above meanings; Alk and Alk' each represents an alkylene residue with 2 to 6 carbon atoms, above all ethylene, propylene-(1,3), propylene-(2,3), butylene-(1,4), butylene-(2,4), pentylene-(1,5) or pentylene-(2,5); $R_1$, $R'_1$, $R_2$ and $R'_2$ each stands for a lower alkyl radical containing up to 4 carbon atoms, for example methyl, ethyl, propyl, isopropyl, butyl or secondary butyl, and $R_1$ and $R'_1$ may also represent hydrogen, or where $R_1+_2R$ and/or $R'_1+R'_2$ represent a lower alkylene, oxaalkylene or azaalkylene residue such as butylene-(1,4), pentylene-(1,5), 3-oxa-pentylene-(1,5) or 3-aza-pentylene(1,5) or 3-methyl- or 3-hy-droxyethyl-3-aza-pentylene-(1,5), and where $R_3$ and $R'_3$ as $R_4$ and $R'_4$ represent hydrogen or lower alkyl or alkoxyalkyl residues, for example methyl, ethyl, propyl, methoxyethyl, ethoxyethyl, ethoxymethyl or methoxymethyl.

In the first place there may be mentioned the compounds of the formula

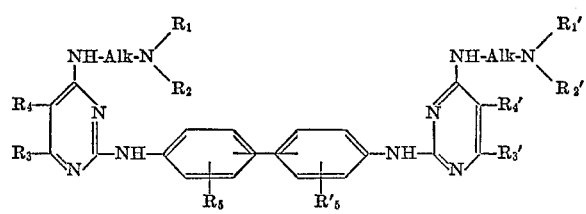

where Alk, Alk' $R_1$ to $R_4$ and $R'_1$ to $R'_4$ have the above meanings and $R_5$ and $R'_5$ represent hydrogen, lower alkyl above all methyl, lower alkoxy above all methoxy or ethoxy, or halogen above all chlorine or bromine, and especially the compounds in which $R_4$ and $R'_4$ represent hydrogen, and more particularly compounds of the formula

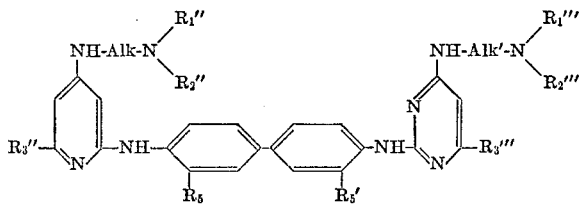

where Alk and Alk' have the last-mentioned meanings; $R_1''$, $R_2''$, $R_1'''$ and $R_2'''$ are lower alkyls, above all methyl, ethyl, propyl, isopropyl, butyl or secondary butyl, and $R_1''$ and $R_1'''$ in the second place may also be hydrogen; $R_5$ and $R_5'$ represent hydrogen, methyl, methoxy, chlorine or bromine and $R_3''$ and $R_3'''$ stand for hydrogen, methyl, ethyl or propyl, and those in which $R_3''$ and $R_3'''$ represent lower alkoxyalkyl.

Of special value is the 4,4'-bis[4-(β-diethylamino-ethylamino)-6-methyl-pyrimidyl - (2) - amino]-diphenyl of the formula

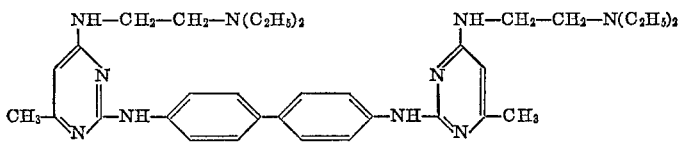

and 4,4'-bis[4-(β - diethylamino-ethylamino) - 6 - methylpyrimidyl-(2)-amino] - 3,3' - dimethoxydiphenyl. Special mention is deserved also by 4,4-bis-[4-(β-diethylaminoethylamino)-6-methyl - pyrimidyl - 2 - amino] - 3,3' - dimethyl-diphenyl, 4,4'-bis-[4-(5' - diethylamino-pentyl - 2'-amino) - 6 - methoxymethyl - pyrimidyl - 2 - animo]-3,3'-dimethoxy-diphenyl, 4,4'-bis-[4-(β - diethylamino - ethylamino)-6-methoxymethyl-pyrimidyl-2 - amino] - diphenyl, and 4,4'-bis-[4-(β-diethylamino-ethylamino)-pyrimidyl-2-amino]-diphenyl.

The new compounds are manufactured in the known manner; advantageously, in a compound of the formula $$Py_1—NH—Ph—X—Ph'—NH—Py_1'$$

where Ph, and Ph' and X have the above meanings, and $Py_1$ and $Py_1'$ are pyrimidyl-(2) residues of which at least one contains in the 4-position a residue (Z) which is convertible into an amino group (Y) which is substituted by an aliphatic residue carrying an amino group and containing more than one carbon atom between the nitrogen atoms, whereas the other may already contain in the 4-position an amino group Y already substituted in this manner—the residue(s) Z is/are converted simultaneously or successively into amino groups Y.

Z is above all a residue that can be exchanged for an amino group, primarily a halogen atom such as chlorine or bromine, or a free or advantageously etherified (for example lower-alkylated or aralkylated, for example benzylated) mercapto group. The residue Z is then exchanged for the amino group Y in the usual manner, advantageously by reaction with the amine H—Y.

The said reactions are carried out in the usual manner, in the presence or absence of diluents and/or condensing agents and/or catalysts, if necessary with heating.

Depending on the reaction conditions employed the new compounds are obtained in the free form or in the form of their salts. From the bases therapeutically useful salts can be formed with acids, for example therapeutically acceptable acids such as hydrohalic acids, sulphuric or phosphoric acids, nitric or perchloric acid; aliphatic, alicyclic, aromatic or heterocyclic carboxylic or sulfonic acids such as formic, acetic, propionic, oxalic, succinic, glycollic, lactic, malic, tartaric, citric, ascorbic, hydroxymaleic dihydroxy-maleic or pyruvic acid; phenylacetic, benzoic, para-aminobenzoic, anthranilic, para-hydroxybenzoic, salicyclic, embonic or para-aminosalicyclic acid; methanesulphonic, ethanesulphonic, hydroxyethane-sulphonic, ethylenesulphonic acid; toluenesulphonic or naphthalenesulphonic acids or sulphanilic acid; methionine, tryptophan, lysine or arginine. A resulting salt can be converted into the free compound.

The salts may also be used for purifying the free compounds. In view of the close relationship between the new compounds in the free form and in the form of their salts, what has been said above and below with reference to the free compounds applies also to the corresponding salts whenever this is possible and advantageous.

The invention further includes any variant of the present process in which an intermediate obtained at any stage of the process is used as starting material and any remaining step or steps is/are carried out or the process is discontinued at any stage thereof, or a starting material is formed under the reaction conditions or is used in the form of a salt thereof, as well as the new starting materials. It is of advantage to use starting materials and reaction conditions that give rise to the final products particularly mentioned above.

The starting materials are known or can be prepared by known methods. The compounds of the formula Py—NH—Ph—X—Ph′—NH—Py′ in which Py and Py′ represent pyrimidyl-(2) radicals carrying in 4-position a hydroxy group, a free or esterified mercapto group or a halogen atom, Ph and Ph′ stand for phenyl radicals, and X for a direct bond, oxygen or a lower, divalent aliphatic hydrocarbon radical, are new and constitute part of the invention. They are obtained, for example, when a compound of the formula H₂N—Ph—X—Ph′—NH₂ in which Ph, Ph′ and X have the meanings given above, is reacted with a 4-hydroxy-2-Z′-pyrimidine, in which Z′ represents a radical which is exchangeable for an amino group, such as, above all, a halogen atom or a free or etherified mercapto group, and, if desired, the hydroxy group is exchanged for a halogen atom by halogenation, for example, with a phosphorus oxyhalide, or for the mercapto group by sulfuration, for example with phosphorus pentasulfide, and the mercapto group, if desired, is etherified in the usual manner. Alternatively, a compound of the formula H₂N—Ph—X—Ph′—Q″ where Ph, Ph′ and X have the above meanings, and Q″ represents a nitro- or acetylamino group is reacted with a 4-hydroxy-2-Z′-pyrimidine (where Z′ has the above meaning), if desired, the hydroxyl group is exchanged for a halogen atom by halogenation, for example with a phosphorus oxyhalide, or for the mercapto group by sulphuration, for example with phosphorus pentasulphide, followed if desired by etherification performed in the usual manner and, if desired, the substituent in the 4-position is exchanged for the amino group Y; the nitro- or acylamino group is then converted into the free amino group, which, if desired, is then subjected to the same sequence of reactions as the first amino group with the exception of at least the final introduction of a second amino group Y. The starting materials so obtained are likewise new and constitute part of the invention.

The resulting final products and their salts may be used as medicaments, for example in the form of pharmaceutical preparations containing them or their salts in conjunction or admixture with a solid or liquid, organic or inorganic pharmaceutical excipient suitable for enteral or parenteral administration. Suitable excipients are substances that do not react with the new compounds, for example water, lactose, starches, magnesium stearate, talcum, vegetable oils, benzyl alcohols, gums, polyalkyleneglycols, cholesterol or other known medicinal excipients. The pharmaceutical preparations may be, for example, tablets or dragees, or in liquid form solutions, suspensions or emulsions. They may be sterilized and/or may contain assistants such as preserving, stabilizing, wetting or emulsifying agents, salts for regulating the osmotic pressure or buffers. They may further contain other therapeutically valuable substances. Such preparation contain, for example, for the treatment of malaria, a quantity of active substance corresponding to an oral dose of 1–20 mg./kg.; for veterinary purposes, the dosis is about 50–200 mg./kg. The preparations are formulated by usual methods.

The following examples illustrate the invention.

Example 1

A mixture of 8.7 g. of 4,4′-bis-(6-methoxymethyl-4-chloropyrimidyl-2-amino)-3,3′-dimethoxydiphenyl and 10 ml. of β-diethylaminoethylamine is heated for 3 hours at the boil, then while still hot poured into 75 ml. of water, whereupon the product soon crystallizes out. The base is suctioned off, dissolved in 200 ml. of ethanol; the solution is treated with active carbon, filtered off and dried over Sikkon, and dry hydrochloric acid is introduced into the filtered solution, having a temperature of 50° C., until saturation is reached. On cooling, the tetrahydrochloride of 4,4′-bis-[4-(β-diethylamino-ethylamino) - 6 - methoxymethyl-pyrimidyl-2-amino]-3,3′-dimethoxydiphenyl of the formula

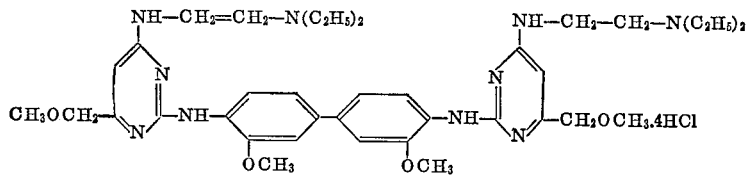

crystallises out. It melts at 255–257° C. after recrystallisation from ethanol.

The starting material may be prepared in the following manner:

129 g. of γ-methoxy-acetoacetic acid ethyl ester and 125 g. of methyl-osothio urea sulphate are added to a solution of 56 g. of potassium hydroxide in 750 ml. of water, and the batch is stirred for 4 days at room temperature. The 2-methylthio-6-methoxymethyl-4-hydroxypyrimidine thus formed is suctioned off and recrystallised from ethanol; it melts at 190–191° C.

A finely powdered mixture of 37.2 g. of the above compound and 24.4 g. of 4,4′-diamino-3,3′-dimethoxydiphenyl is heated in an oil bath for 4 hours at 190° C. The cooled mass is comminuted and twice extracted by boiling with 150 ml. of ethanol and then suction-filtered while still hot. After having been recrystallised from aqueous dimethylformamide, 4,4′-bis-(6-methoxymethyl-4-hydroxy-pyrimidyl-2-amino)-3,3′-dimethoxydiphenyl melts at 314–315° C. with decomposition.

44 g. of the above product are mixed with 250 ml. of phosphorus oxychloride and a few drops of triethylamine and refluxed for 3 hours; the phosphorus oxychloride is then distilled off under vacuum and the residue is placed on ice. The precipitate is suctioned off and washed successively with much water, dilute ammonia, water and finally with ethanol. 4,4′-bis-(6-methoxymethyl-4-chloropyrimidyl - 2 - amino)-3,3′-dimethoxydiphenyl decomposes at 208–209° C. after having been recrystallised from aqueous dimethylformamide.

Example 2

A mixture of 8.7 g. of 4,4′-bis-(6-methoxymethyl-4-chloropyrimidyl - 2 - amino)-3,3′-dimethoxydiphenyl and 12 ml. of 2-amino - 5 - diethylaminopentane is heated in an oil bath at 180° C. The hot oil is poured into 100 ml. of ice water, whereupon crystallisation sets in. After some hours the base is suctioned off and dissolved in 200 ml. of ethanol. This solution is treated with active carbon and dried over Sikkon, whereupon dry hydrochloric acid is introduced until saturation has been reached. The 4,4'-bis-[4-(5-di-ethylamino-pentyl-2-amino) - 6 - methoxymethyl-pyrimidyl - 2 - amino] - 3,3' - dimethoxydiphenyl tetrahydrochloride of the formula

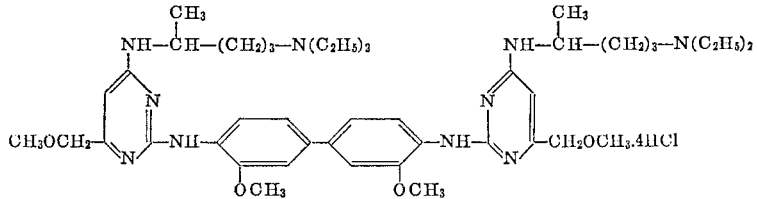

settles out on cooling and can be recrystallised from ethanol; it melts at 176–178° C. with decomposition.

Example 3

A mixture of 23.7 g. of 4,4'-bis-(6-methyl-4-chloro-pyrimidyl-2-amino)-3,3'-dichlorodiphenyl and 47.5 ml. of β-diethylamino-ethylamine is refluxed for 2 hours in an oil bath at 130° C. The batch is then poured into 1 liter of water, and the precipitate is suctioned off, washed with water and heated in 650 ml. of 2 N -hydrochloric acid for 1 hour with animal carbon. The solution is filtered and evaporated to dryness under vacuum. The adhering water is removed by several evaporations with ethanol and then with a mixture of benzene-petroleum ether and dried, and the residue is recrystallised from ethanol and then several times from methanol. The resulting 4,4'-bis-[4-(β-diethyl-amino-ethylamino)-6-methyl-pyrimidyl-2-amino] - 3,3'-dichlorodiphenyl tetrahydrochloride of the formula

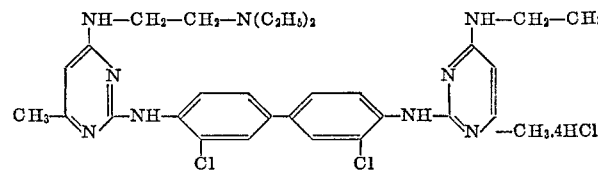

contains 1 mol of methanol of crystallisation; it melts at 310–313° C. with decomposition.

When the above hydrochloride is dissolved in water, the solution is filtered through animal charcoal and aqueous ammonia is added, the free base is obtained which is recrystallised from acetone. It melts at 133–134° C.

The starting material is obtained in the following manner:

A finely powdered mixture of 38.7 g. of 2-methylthio-6-methyl-4-hydroxypyrimidine and 15.6 g. of 4,4'-diamino-3,3'-dichlorodiphenyl is heated for 3 hours in an oil bath at 200–210° C. The cooled mass is comminuted and three times boiled with ethanol, suction-filtered while still hot, then washed with petroleum ether and dried, to yield 4,4'-bis-(6-methyl - 4 - hydroxypyrimidyl - 2 - amino)-3,3'-dichlorodiphenyl, melting above 330° C.

20 g. of the above product are mixed with 140 ml. of phosphorus oxychloride and refluxed for 4 hours. The mixture is then poured over ice and alkalinised after a few minutes with concentrated aqueous ammonia. The precipitate is suctioned off, washed with water and dried. The resulting 4,4' - bis - (6 - methyl-4-chloropyrimidyl-2-amino)-3,3'-dichlorodiphenyl can be recrystallised from methylcarbitol; it melts above 320° C.

Example 4

A mixture of 15.9 g. of 4,4'-bis-(6-methyl-4-chloro-pyrimidyl-2-amino)-3,3'-dimethoxydiphenyl and 40 ml. of β-diethylamino-ethylamine is refluxed at the boil for 4 hours. The viscid mass is vigorously stirred in a fine jet into about 750 ml. of water, left to itself for one hour, then suction-filtered and the filter cake is crystallised from acetone with addition of water. The resulting 4,4'-bis-[4-(β - diethylamino - ethylamino) - 6 - methylpyrimidyl - 2-amino]-3,3'-dimethoxydiphenyl of the formula

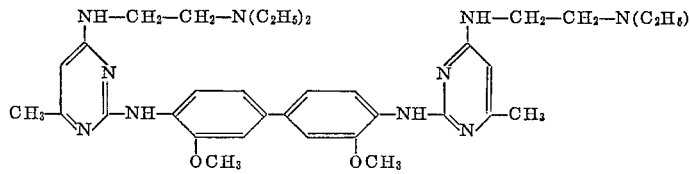

melts at 95–97° C. after recrystallisation from acetone with addition of water. The tetrahydrochloride is prepared in the usual manner; it melts at 281–283° C.

Example 5

A mixture of 13 g. of 4,4'-bis-(6-methyl-4-chloro-pyrimidyl-2-amino)-3,3'-dimethyl-diphenyl and 35 ml. of β-diethylamino-ethylamine is refluxed at the boil for 4 hours. The cooled mixture is poured into water, and the crystallised amine is suctioned off and washed with water. On addition of excess of 1 N aqueous hydrochloric acid and evaporation under vacuum, there results the tetrahydrochloride of 4,4'-bis[4-(β-diethylamino-ethylamino)-6 - methylpyrimidyl - 2 - amino] - 3,3' - dimethyldiphenyl of the formula

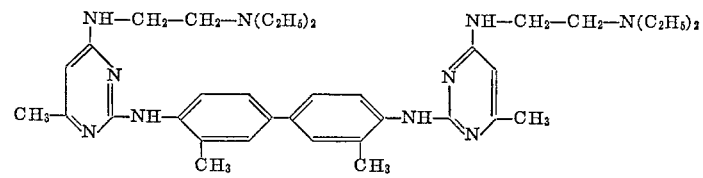

which, after crystallisation from butanol+ethanol (1:1), melts at 245–248° C. with decomposition.

The starting material is prepared in the following manner:

An intimate mixture of 20 g. of 2-methylthio-6-methyl-4-hydroxypyrimidine and 13.6 g. of 4,4'-diamino-3,3'-dimethyldiphenyl is heated in an oil bath to 200° C. When the melt has solidified, it is thoroughly comminuted when cold and once more heated to 210° C., allowed to cool again, and extracted three times with ethanol. The residue is dissolved in 2 N sodium hydroxide solution, the solution is filtered through active carbon and then acidified with acetic acid of 50% strength. The precipitate is suctioned off, washed with water and dried. The resulting 4,4'-bis-(6 - methyl - 4 - hydroxypyrimidyl - 2 - amino) - 3,3'-dimethyldiphenyl does not melt up to 350° C. This product is refluxed for 4 hours in admixture with 88 ml. of phosphorus oxychloride. The mixture is then poured over ice and 30 minutes later alkalinised with concentrated aqueous ammonia. The precipitate is suctioned off, washed with water and cautiously dried. The resulting crude 4,4' - bis - (6 - methyl - 4 - chloropyrimidyl - 2-amino)-3,3'-dimethyldiphenyl decomposes at 310° C. It is further used as it is.

Example 6

A mixture of 32 g. of 4,4'-bis-(6-methyl-4-chloropyrimidyl-2-amino)-diphenyl and 85 ml. of β-diethylaminoethylamine is refluxed at the boil for 4 hours. Water is then added, the mixture is triturated, filtered, and the solid product is thoroughly washed with water. It is then dissolved in about 250 ml. of ethanol and mixed with 20 ml. of concentrated hydrochloric acid, whereupon crystallisation sets in. The resulting tetrahydrochloride of 4,4'-bis - [4 - (β - diethylamino - ethylamino) - 6 - methyl-pyrimidyl-2-amino]-diphenyl of the formula

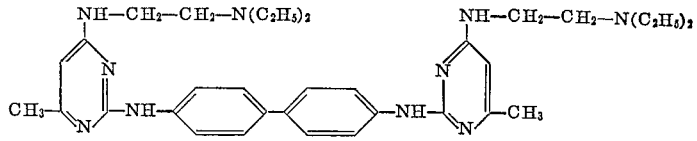

melts at 317–318° C. with decomposition after recrystallisation from ethanol of 80% strength with addition of ethyl acetate.

The starting material is obtained in the following manner:

An intimate mixture of 30 g. of 2-methylthio-6-methyl-4-hydroxypyrimidine and 17.4 g. of 4,4'-diaminodiphenyl is slowly heated to 170° C. in an oil bath; the initially molten mass gradually solidifies. After 30 minutes at 170° C. the product is comminuted and three times extracted by boiling with ethanol. The residue is dissolved in 2 N sodium hydroxide solution; the solution is filtered through animal charcoal and then acidified with glacial acetic acid. The precipitate is filtered off, washed with water and cautiously dried, to yield 4,4'-bis-(6-methyl-4-hydroxypyrimidyl-2-amino)-diphenyl melting at 300° C. 38 g. of this product are mixed with 350 ml. of phosphorus oxychloride and refluxed at the boil for 3 hours, then poured over ice water, and 30 minutes later rendered weakly alkaline with concentrated aqueous ammonia. The precipitate is then suctioned off, washed with dilute aqueous ammonia and with water and cautiously dried, to yield crude 4,4'-bis-(6-methyl-4-chloropyrimidyl-2-amino)-diphenyl which is used as it is.

Example 7

A mixture of 46 g. of 4,4'-bis-(4-chloro-6-methyl-pyrimidyl-2-amino)-diphenyl and 44.85 g. of γ-dimethylamino-propylamine is refluxed for 2½ hours at the boil, whereupon the mixture becomes homogeneous. It is cooled to room temperature and stirred vigorously into 1 liter of cold water and then kept overnight. The resulting 4,4' - bis - [4 - (γ - dimethylamino - propylamino) - 6-methyl-pyrimidyl-2-amino]-diphenyl of the formula

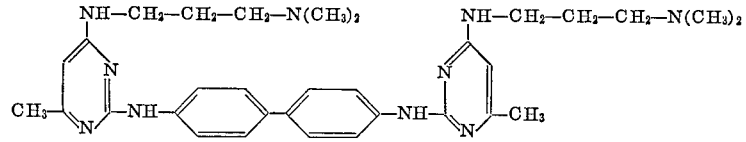

is filtered off, washed with water and dried under vacuum. It melts at 85–100° C.

A warm solution of 36.8 g. of this product in ethanol is filtered, cooled, and 70 ml. of 47% hydriodic acid are added. The batch is cooled overnight, the precipitated tetrahydriodide is filtered off and repeatedly recrystallised from methanol. It melts at 283 to 285° C.

A hot solution of 36.8 g. of 4,4'-bis-[4-(γ-dimethylamino-propylamino)-6-methyl-pyrimidyl - 2 - amino]-diphenyl in ethanol is filtered and 35 ml. of an 8.42 N-ethanolic solution of hydrogen chloride are added. The whole is cooled overnight, and the precipitated tetrahydrochloride is filtered off and recrystallized from methanol. It melts at 282 to 284° C. and contains 2 mols of methanol of crystallisation.

The starting material is obtained thus: A mixture of 50 g. of 4-hydroxy-6-methyl-2-methylthiopyrimidine and 29 g. of 4,4'-diaminodiphenyl is fused at 200 to 210° C. and the melt is heated for 30 minutes longer at the same temperature. The batch is cooled to room temperature, the reaction product is extracted by being boiled with 3 portions of ethanol, comminuted under ethanol, the ethanol is decanted and the residue is dissolved in excess 2 N sodium hydroxide solution. The solution is clarified with animal charcoal, filtered while hot and treated with 300 ml. of glacial acetic acid. The resulting 4,4'-bis-(4-hydroxy-6-methyl-pyrimidyl-2-amino)-diphenyl is filtered off and dried in air. It does not melt up to 300° C.

A mixture of 54.6 g. of the above product and 550 ml. of phosphorus oxychloride is refluxed at the boil for 9½ hours, then allowed to cool to room temperature, poured over crushed ice and adjusted with concentrated ammonia to pH=8. The batch is allowed to stand overnight and the resulting 4,4'-bis-(4-chloro-6-methyl-pyrimidyl-2-amino)-diphenyl is filtered off and washed with dilute aqueous ammonia, water and ethanol.

Example 8

A mixture of 19.2 g. of 4,4'-bis-(4-chloro-6-methyl-pyrimidyl-2-amino)-3,3'-dimethyldiphenyl and 22.46 g. of γ-dimethylamino-propylamine is refluxed at the boil for 2 hours. The solution is poured into 1 liter of cold water, and the resulting 4,4'-bis-[4-(γ-dimethylamino-propylamino)-6-methyl-pyrimidyl - 2 - amino]-3,3'-dimethyldiphenyl of the formula

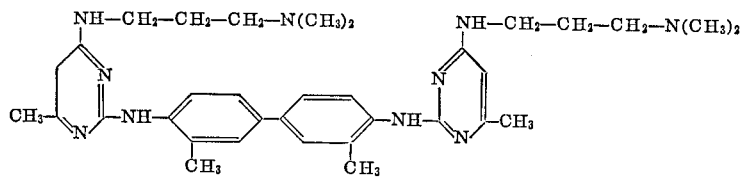

is filtered off. A hot ethanolic solution of 42.5 g. of this product is filtered, cooled to room temperature and 5 ml. of an 8.42 N ethanolic solution of hydrogen chloride are added. The mixture is cooled for 3 days, ether is added and the tetrahydrochloride separates out; it is recrystallised from ethanol containing a small amount of ethanolic hydrogen chloride and melts at 248–250° C.

The starting material is prepared in the following manner: A mixture of 21.23 g. of 4-hydroxy-6-methyl-2-methylthiopyrimidine and 21.23 g. of 3,3'-dimethyl-4,4'-diaminodiphenyl is heated to 140° C. In the course of 5 hours the temperature is then raised to, and maintained for 1 hour at, 190° C. The batch is cooled, kept overnight, extracted by boiling with 5×100 ml. of ethanol and the extract is dissolved in a warm 3 N aqueous sodium hydroxide solution. The solution is treated with animal charcoal boiled, filtered and precipitated with acetic acid. The desired 4,4'-bis-(4-hydroxy-6-methyl-pyrimidyl-2-amino)-3,3'-dimethyldiphenyl is filtered off, washed with alcohol and dried under vacuum. It does not melt up to 300° C.

A mixture of 25.6 g. of the above product and an excess of phosphorus oxychloride is refluxed at the boil for 4 hours and then poured over 1500 cc. of crushed ice. The mixture is adjusted to pH=8 with aqueous ammonia, kept overnight and the resulting 4,4'-bis-(4-chloro-6-methyl-pyrimidyl-2-amino)-3,3'-dimethyldiphenyl is filtered off, washed with dilute ammonia, water and ethanol and dried. It does not melt up to 300° C.

Example 9

A mixture of 61.4 g. of 4,4'-bis-(4-chloro-6-methyl-pyrimidyl-2-amino)-diphenyl and 190 g. of γ-diethylaminopropylamine is refluxed for 8 hours and then poured into 680 ml. of cold water. The gummy residue is triturated with water until crystallization is complete. The resulting 4,4'-bis - [4 - (γ-diethylamino-propylamino)-6-methyl-pyrimidyl-2-amino]-diphenyl of the formula

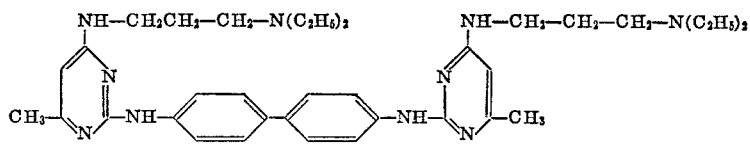

is filtered off and dried. A solution of 85.8 g. of this product in 800 ml. of ethanol is boiled with animal charcoal, filtered while hot and cooled, and 71 ml. of a 7.41 N ethanolic solution of hydrogen chloride are added. The resulting tetrahydrochloride is filtered off and repeatedly recrystallized with the use of animal charcoal and a small amount of ethanolic hydrogen chloride. It contains 2 mols of methanol of crystallisation and melts at 300 to 301° C.

Example 10

A mixture of 57.2 g. of 4,4'-bis-(4-chloro-6-methylpyrimidyl-2-amino)-diphenyl and 150 g. of γ-dibutylaminopropylamine is refluxed for 5 hours and then poured into 690 ml. of water. After cooling to room temperature the aqueous phase is separated from the brown, oily phase; the latter is washed with water, evaporated under reduced pressure and dissolved in 150 ml. of hot ethanol. The organic phase is treated with animal charcoal, filtered hot and then allowed to cool. 65 ml. of 7.14 N ethanolic hydrogen chloride solution are then added, the mixture is allowed to cool and the precipitate is filtered off. The resulting 4,4'-bis - [4 - (γ-dibutylamino-propylamino)-6-methyl-pyrimidyl-2-amino]-diphenyl tetrahydrochloride of the formula

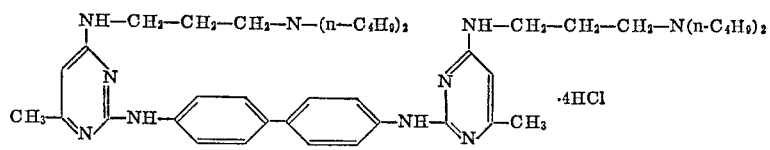

is recrystallised from ethanol with the use of animal charcoal. It melts at 278° C.

Example 11

A mixture of 82 g. of 4,4'-bis-(4-chloro-6-methyl-pyrimidyl-2-amino)-diphenyl and 238 g. of δ-diethylamino-α-methyl-n-butylamine is refluxed at the boil for 14½ hours and then vigorously stirred into 1 liter of water. The aqueous phase is decanted from the gummy residue and the latter is taken up in 250 ml. of hot 2 N hydrochloric acid. The solution is clarified with animal charcoal, filtered, cooled to room temperature, and a solution of 10 ml. of concentrated aqueous ammonia in 150 ml. of water is slowly stirred in, whereupon 4,4'-bis-[4-(δ-diethylamino-α-methyl-n-butylamino)-6 - methyl - pyrimidyl - 2 - amino]-diphenyl of the formula

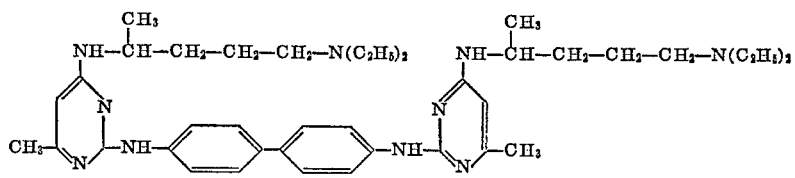

precipitates; it is filtered off (113 g. and dissolved in 700 ml. of hot ethanol. After cooling, 90 ml. of 7.14 N ethanolic hydrochloric acid are added. After cooling and dilution with ether, the tetrahydrochloride settles out; it is recrystallised from ethanol with the use of animal charcoal and a small amount of ethanolic hydrochloric acid. It melts at 256 to 264° C.

Example 12

A mixture of 13.4 g. of 4,4'-bis-(4-chloro-6-methylpyrimidyl-2-amino)-3,3'-dimethoxydiphenyl and 38 ml. of γ-dimethylamino-propylamine is refluxed for 4 hours at the boil. The excess amine is removed by distillation and the residue is vigorously stirred into 500 ml. of water. The precipitated 4,4'-bis-[4-(γ-dimethylamino - propylamino)-

6-methyl-pyrimidyl-2-amino]-3,3' - dimethoxydiphenyl of the formula

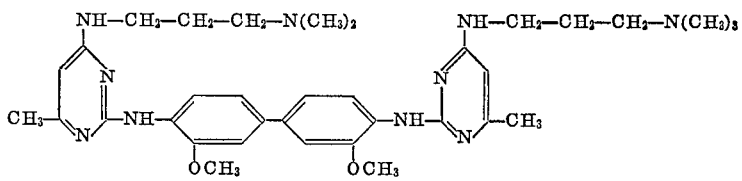

is filtered off; it melts at 83° to 85° C. 16.5 g. of this product are dissolved in a minimum of methylethyl ketone, filtered and mixed with 25 ml. of 7.7 N ethanolic hydrochloric acid, whereupon on cooling the tetrahydrochloride settles out. It is washed with ether and dissolved in a 1:1-mixture of ethanol and methanol. The solution is evaporated, mixed with 15 ml. of 5,5 N ethanolic hydrochloric acid and diluted with ether. On cooling the solution, pure tetrahydrochloride, melting at 232 to 236° C. with decomposition, precipitates.

The starting material is obtained thus: A mixture of 31.23 g. of 4-hydroxy-2-methylthio-6-methylpyrimidine and 24.4 g. of 3,3'-dimethoxy-4,4'-diaminodiphenyl is heated for 8 hours at 190 to 220° C. The mass is powdered, heated for another hour at the temperature mentioned and then cooled. The product is extracted by being boiled with 3×100 ml. of ethanol, then dissolved in excess 2 N sodium hydroxide solution and filtered while hot. The filtrate is cooled and adjusted to pH 5.6 with glacial acetic acid. The batch is kept overnight and the 4,4'-bis-(4-hydroxy-6-methylpyrimidyl-2-amino-3,3' - dimethoxydiphenyl is filtered off, washed with water and ethanol and dried under vacuum.

A mixture of 14.38 g. of the above product and 100 ml. of phosphorus oxychloride is refluxed for 6 hours at the boil and then poured over 800 ml. of crushed ice, kept overnight, adjusted with aqueous ammonia to pH 8, and the precipitated 4,4'-bis-(4-chloro-6-methyl - pyrimidyl - 2-amino)-3,3'-dimethoxydiphenyl is filtered off, washed with dilute aqueous ammonia and ethanol and dried; it melts at 286° C. with decomposition.

tion. It melts at 263 to 266° C. with decomposition. The starting material is prepared in the following manner:

1 mol of freshly prepared sodium ethanolate in 1 liter of ethanol is mixed with 170.2 g. of 4-hydroxy-2-mercapto-6-n-propylpyrimidine; the mixture is refluxed for 6 hours at the boil, 142 g. of methyl iodide are added. The whole is refluxed for another 14 hours, then cooled, and 4-hydroxy-2-methylthio-6 - n - propylpyrimidine is filtered off and dried. It melts at 145 to 146° C.

A mixture of 44.4 g. of the above product and 23.5 g. of 4,4'-diaminodiphenyl is heated at 200° C. until a homogeneous reaction product has formed, which takes about 6 hours. The cooled reaction mixture is comminuted and washed with 4×100 ml. of ethanol. The residue is dissolved in an excess of 2 N sodium hydroxide solution. The solution is filtered and adjusted with acetic acid to pH=5. The precipitated 4,4'-bis(4-hydroxy-6 - n - propylpyrimidyl-2-amino)-diphenyl is filtered off and dried under vacuum.

A mixture of 49.5 g. of the above product and 400 ml. of phosphorus oxychloride is refluxed at the boil for 5 hours and then poured over 1500 cc. of crushed ice. The reaction mixture is alkalinised with aqueous ammonia and then left to itself. The desired 4,4'-bis-(4-chloro-6-n-propyl-pyrimidyl - 2 - amino) - diphenyl is filtered off, washed with aqueous ammonia and with water and dried.

Example 14

A mixture of 14.3 g. of 4,4'-bis-(4-chloro-6-methyl-pyrimidyl-2-amino)-3,3'-dichlorodiphenyl and 43 g. of γ-dimethylamino-propylamine is refluxed for 6 hours at the boil and then poured into 1 liter of water, whereupon 4,4'-bis-[4-(γ-dimethylamino-propylamino)-6-methyl - pyrimidyl-2-amino]-3,3'-dichlorodiphenyl of the formula.

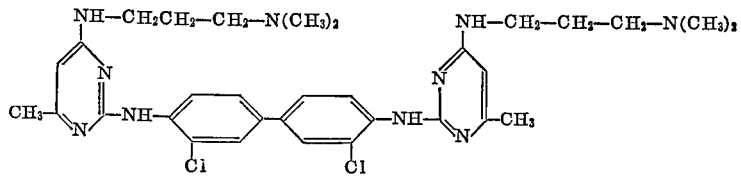

Example 13

A mixture of 49.9 g. of 4,4'-bis-(4-chloro-6-n-propyl-pyrimidyl-2-amino)-diphenyl and 223.6 g. of γ-(dibutylamino)-propylamine is refluxed for 5 hours. The excess amine is distilled off under diminished pressure and the residue stirred into 1500 ml. of cold water. The batch is cooled overnight, the viscid, oily material is extracted with ethylmethyl ketone, the organic phase is dried over sodium sulphate, filtered and treated with 5.5 ml. of 5.5 N ethanolic hydrochloric acid. The whole is then diluted with 200 ml. of ether, cooled, a small precipitate is filtered off, and the filtrate is concentrated to 500 ml. and once more treated with 10 ml. of 5 N ethanolic hydrochloric acid, whereupon 4,4'-bis-[4-(γ-dibutylamino-propylamino)-6-n-propyl-pyrimidyl-2-amino]-diphenyl tetrahydrochloride of the formula

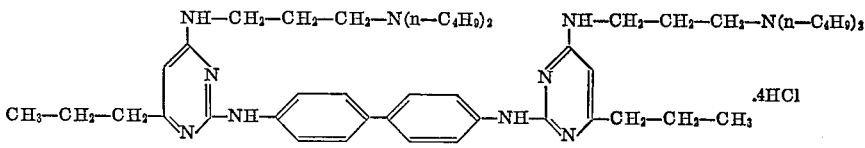

settles out. It is recrystallised from ethanol containing a small amount of ethanolic hydrochloric acid and evaporation. crystallises out, it is filtered off and dried under vacuum. A solution of 12.7 g. of this product in 400 ml. of ethylmethyl ketone is filtered, treated with 35 ml. of a 5.5 N-ethanolic hydrochloric acid and cooled, whereupon the tetrahydrochloride settles out. After recrystallisation from ethanol with addition of a small amount of ethanolic hydrochloric acid it melts at 228 to 244° C.

Example 15

A mixture of 31 g. of 4,4'-bis-(4-chloro-6-methyl-pyrimidyl-2-amino)-3,3'-dimethoxydiphenyl and 60 g. of δ-diethyl-amino-α-methyl-butylamine is refluxed for 6 hours at 160° to 170° C. The excess amine is distilled off under reduced pressure and the residue poured into 1 liter of cold water. The whole is kept for several days with occasional stirring and the resulting 4,4'-bis-[4-(δ - diethylamino - α-methyl - butylamino) - 6 - methylpyrimidyl-2-amino]-3,3'-dimethoxy-diphenyl of the formula.

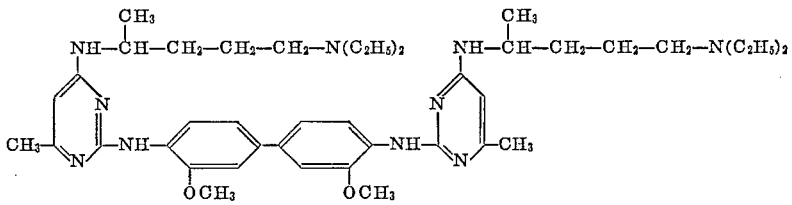

is filtered off; it melts at 80° to 85° C. A solution of 99.5 g. of the base in ethanol is filtered, and 20 ml. of a 7.7 N-ethanolic hydrochloric acid solution are added. The solution is evaporated and the free base is obtained by treatment with aqueous ammonia; it is dried under vacuum, dissolved in ethylmethyl ketone and mixed with ethanolic hydrochloric acid, whereupon the gummy tetrahydrochloride precipitates; it is again converted into the free base and the latter, again in ethylmethyl ketone, into the tetrahydrochloride which melts at 165 to 167° C. after recrystallisation from ethanol and drying.

Example 16

A mixture of 34 g. of 4,4'-bis-(4-chloro-6-n-propyl-pyrimidyl-2-amino)-diphenyl ether and 132 g. of γ-dibutyl-amino-propylamine is refluxed for 24 hours at the boil and then stirred into cold water. The oil is extracted with benzene and the organic phase dried over magnesium sulphate and treated with 50 ml. of 5.8 N-ethanolic hydrochloric acid, whereupon the hydrochloride settles out in the form of an oil which is separated and again converted into the free base with aqueous ammonia. After 3 days' standing, the desired 4,4'-bis-[4-(γ-dibutylamino - propylamino) - 6-n-propyl-pyrimidyl-2-amino]-diphenyl ether of the formula

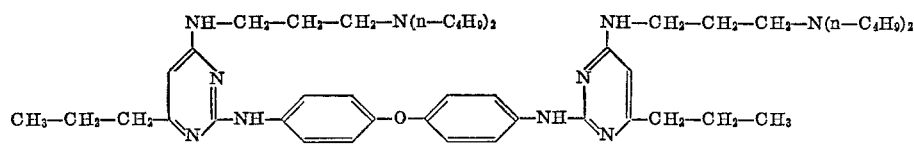

is filtered off, dried in air and dissolved in 1200 ml. of ethanol and 400 ml. of methanol. 75 ml. of 5.8 N-ethanolic hydrochloric acid are added and the whole is diluted with 1.5 liters of ether. After 4 days' cooling, the tetrahydrochloride crystallises out; it is filtered off, dried and recrystallised from butanol. It melts at 190 to 195° C.

The starting material is obtained thus: A mixture of 27.9 g. of 4-hydroxy-2-methylthio-6-n-propylpyrimidine and 14.2 g. of 4,4'-diaminodiphenyl ether is heated for 5½ hours at 150 to 180° C, then cooled and thoroughly washed with 3×100 ml. of ethanol. The insoluble 4,4'-bis - (4-hydroxy-6-n-propyl-pyrimidyl-2-amino)-diphenyl ether is taken up in an excess of 2 N-sodium hydroxide solution, the solution is filtered while hot and acidified with acetic acid. The diphenyl ether purified in this manner is filtered and dried under reduced pressure.

A mixture of 25.7 g. of 4,4'-bis-(4-hydroxy-6-n-propyl-pyrimidyl-2-amino)-diphenyl ether and 150 ml. of phosphorus oxychloride is refluxed for 16 hours at the boil and then poured over ice. The mixture is adjusted with ammonia to pH=8, and the resulting 4,4'-bis-(4-chloro-6-n-propyl-pyrimidyl-2-amino)-diphenyl ether is filtered off, washed with dilute aqueous ammonia and with water and dried. It melts at 90 to 91° C.

Example 17

A mixture of 27.2 g. of 4,4'-bis-(4-chloro-6-n-propyl-pyrimidyl-2-amino)-diphenylmethane and 71.5 g. of γ-dibutylamino-propylamine is refluxed for 40 hours at the boil. The excess amine is removed by distillation and the residue is vigorously stirred into water. The water is decanted from the resulting viscous material which is then triturated with ethylmethyl ketone. The resulting organic solution is evaporated and the orange-colored oil dissolved in benzene. The benzolic solution is dried over magnesium sulphate and treated with 120 ml. of 5.5 N-ethanolic hydrochloric acid. On addition of ether, 4,4' - bis - [4-(γ-dibutylamino-propylamino)-6-n-propyl-pyrimidyl - 2-amino]-diphenylmethane tetrahydrochloride of the formula

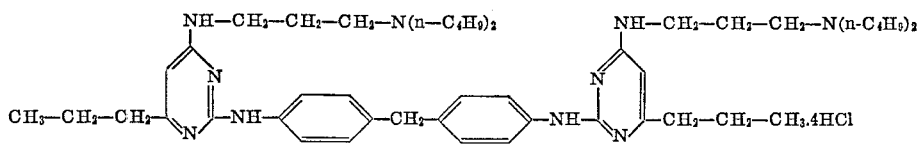

crystallises out. After recrystallisation from a mixture of 400 ml. of methanol and 10 ml. of 5.5 N-ethanolic hydrochloric acid it melts at 225 to 230° C.

The starting material is obtained thus: A mixture of 27.9 g. of 4-hydroxy-2-methylthio-6-n-propyl-pyrimidine and 15.1 g. of 4,4'-diamino-dephenylmethane is heated for 20½ hours at 190 to 200° C, whereupon the resulting product is comminuted and boiled with 3×100 ml. of ethanol. The residue is dissolved in excess 2 N-sodium hydroxide solution and the desired 4,4'-bis-hydroxy-6-n-propyl-pyrimidyl-2-amino)-diphenylmethane is precipitated with acetatic acid; it is filtered off and washed with water and ethanol. It melts at 283 to 286° C. with decomposition.

A mixture of 28.1 g. of dry 4,4'-bis-(4-hydroxy-6-n-propyl-pyrimidyl-2-amino)-diphenylmethane and 150 ml. of phosphorus oxychloride is refluxed for 25 hours and then poured over crushed ice. The batch is adjusted with aqueous ammonia to pH=8, and the resulting 4,4'-bis-(4 - chloro - 6 - n - propyl-pyrimidyl-2-amino)-diphenylmethane is filtered off, washed with dilute ammonia, water and ethanol. It melts at 200 to 210° C. with decomposition.

Example 18

A mixture of 14.6 g. of 3,3'-dichloro-4,4'-bis-(4-chloro-6-methyl-pyrimidyl-2-amino)-diphenyl and 22.4 g. of γ-dibutyl-amino-propylamine is refluxed for 24 hours at the boil. The excess amine is removed by distillation under diminished pressure and the residue taken up in dilute hydrochloric acid. The solution is filtered and the filtrate treated with aqueous ammonia, whereupon 4,4'-bis-[4-(γ-dibutylamino-propylamino)-6-methyl-pyrimidyl-2-amino]-3,3'-dichlorodiphenyl of the formula

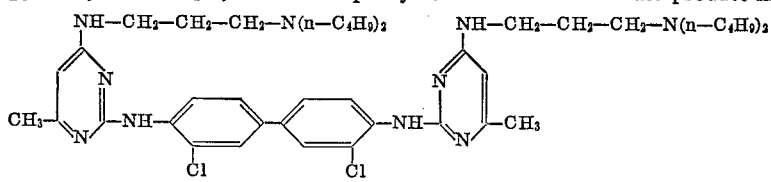

precipitates; it is filtered off, dried under reduced pressure and dissolved in ethylmethyl ketone. On addition of ethanolic hydrochloric acid the tetrahydrochloride, melting at 176 to 178° C. with decomposition, is obtained.

Example 19

A mixture of 12.5 g. of 4,4'-bis-(4-chloropyrimidyl-2-amino)-diphenyl and 34.69 g. of γ-dibutylaminopropylamine is heated for 15 hours at the boil. The insoluble matter is filtered off and freed from excess amine under vacuum. The residue is taken up in ethylmethyl ketone, freed from insoluble matter by filtration and caused to crystallise by adding ethanolic hydrochloric acid. The resulting 4,4' - bis - [4-γ - dibutylamino-propylamino)-pyrimidyl-2-amino)-diphenyl tetrahydrochloride of the formula

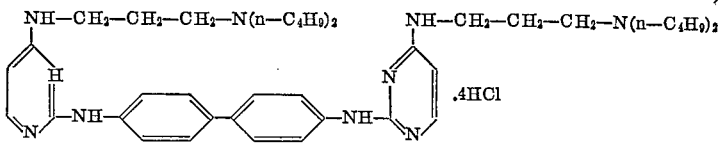

which melts at 260 to 262° C. after recrystallisation from ethanol.

The starting material is obtained thus: A solution of 1 mol of sodium ethanolate in 1 liter of ethanol is mixed with 128.1 g. of 4-hydroxy-2-mercaptopyrimidine. The mixture is refluxed for 8 hours at the boil and then treated with 142 g. of methyl iodide. The batch is then refluxed for 1 day at the boil, kept overnight at room temperature, heated once more, and the insoluble matter is filtered off. The filtrate is cooled and the precipitated 4-hydroxy-2-methylthiopyrimidine is filtered off. After recrystallisation from methanol it melts at 192 to 194° C.

Example 20

23 g. of the 4,4'-bis-(6-methyl-4-chloropyrimidyl-2-amino)-diphenyl described in Example 6 are refluxed for 3 hours with 30 ml. of β-methylamino-ethylamine. While still hot, the mixture is stirred into ice-water, the solid product triturated, filtered, and washed well with water. It is dissolved in about 300 ml. of ethanol, and hydrogen chloride introduced into the solution, whereupon the 4,4' - bis - [4-(β-methylamino-ethylamino)-6-methyl-pyrimidyl-2-amino] - diphenyl-tetrahydrochloride of the formula

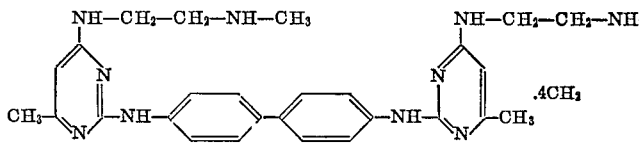

precipitates. After being recrystallized from 70% ethanol, the product melts at 238–240° C. with decomposition.

Example 21

A mixture of 23 g. of the 4,4'-bis-(6-methyl-4-chloropyrimidyl-2-amino)-diphenyl described in Example 6 and 30 ml. of β-dimethylamino-ethylamine are refluxed for 3 hours. While still warm, the mixture is stirred into ice-water, whereupon the 4,4'-dis-[4-(β-dimethylamino-ethylamino)-6-methyl-pyrimidyl-2-amino] - diphenyl of the formula

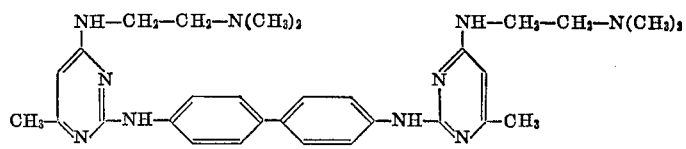

precipitates. It is triturated, filtered, washed well with water, dissolved in ethanol, and precipitated in the form of the tetrahydrochloride by introducing hydrogen chloride. After being recrystallized from 80% ethanol the product melts and decomposes at 301° C.

Example 22

10 g. of 4,4'-bis-(6-methoxymethyl-4-chloro-pyrimidyl-2-amino)-diphenyl are boiled for 3 hours with 12 ml. of β-diethylamino-ethylamine. The hot mixture is poured on to ice water, whereupon the 4,4'-bis-[4-(β-diethylamine)-6-methoxymethyl-pyrimidyl-2-amino]-diphenyl of the formula

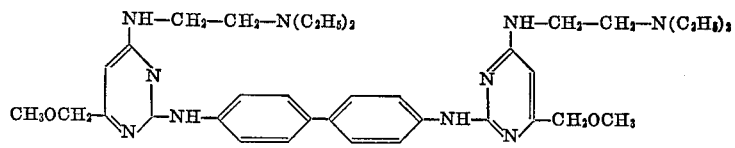

crystallizes out. The base is suctioned off, dissolved in 200 ml. of ethanol, and the solution treated with active carbon, then filtered and dried over Sikkon. Dry hydrogen chloride is introduced into the filtered solution. On addition of ethyl acetate the tetrahydrochloride precipitates, and is recrystallized several times from ethanol containing some ethyl acetate. Melting point, 256–258° C. (with decomposition).

The starting material can be prepared as follows:

55.8 g. of the 2-methylthio-6-methoxymethyl-4-hydroxypyrimidine described in Example 1 are finely powdered with 27.6 g. of benzidine and heated at 190° C. for 4 hours on an oil bath. After cooling, the mass is pulverized and extracted twice by boiling with 180 ml. of ethanol, and filtered hot. After being recrystallized several times from glacial acetic acid, the 4,4'-bis-(6-methoxymethyl-4-hydroxy-pyrimidyl-2-amino) - diphenyl melts at 327–328° C.

44.5 g. of it are refluxed for 3 hours with 250 ml. of phosphorus oxychloride and a few drops of triethylamine. The phosphorus oxychloride is distilled off under reduced pressure and the residue poured on ice, the precipitate that forms is filtered off with suction, dissolved in dilute ammonia, suctioned off again, dried, and recrystallized from a mixture of dimethyl formamide and water. The 4,4' - bis - (6 - methoxy-methyl - 4 - chloro - pyrimidyl-2-amino)-diphenyl does not melt up to a temperature of 300° C.

6-methyl-pyrimidyl-2-amino]-diphenylmethane of the formula

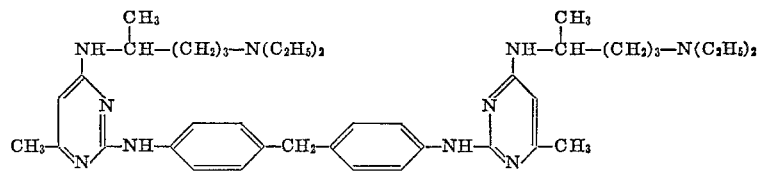

Example 23

12.3 g. of 4,4' - bis - (4 - chloro-pyrimidyl-2-amino)-diphenyl and 15 ml. of β-diethylamino-ethylamine are heated together at 150° C. on an oil bath. The hot mixture is poured into ice-water, the solid product triturated, suctioned off, and dissolved in 200 ml. of ethanol. The batch is treated with active carbon and dried over Sikkon, and hydrogen chloride then introduced, whereupon the tetrahydrochloride of 4,4'-bis-[4-(β-diethylamino - ethylamine)-pyrimidyl-2-amino]-diphenyl of the formula

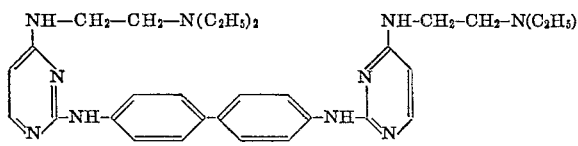

precipitates. After being recrystallized several times it melts and decomposes from 236° C. upwards.

The starting material can be obtained as follows:

56.8 g. of 2-methylthio-4-hydroxy-pyrimidine are finely pulverized together with 36.8 g. of benzidene and heated to 190° C. for 3 hours on an oil bath. After cooling, the reaction mass is pulverized, extracted twice by boiling with 250 ml. of ethanol, and suction-filtered while still hot, then washed with petroleum ether, and dried. The product is purified by being dissolved in 2 N sodium hydroxide solution and precipitated with acetic acid. Melting point >300° C.

37.2 g. of this product are boiled for 5 hours with 250 ml. of phosphorus oxychloride and a few drops of triethylamine. 250 ml. of toluene are added, and the resulting precipitate filtered off after cooling. The residue is slurried in dilute ammonia, filtered off with suction, washed well with ethanol, and recrystallized from aqueous dimethyl formamide. Melting point >300° C.

Example 24

A mixture of 9.02 g. of 4,4'-bis-(4-chloro-6-methyl-pyrimidyl-2-amino)-diphenylmethane and 14.1 g. of 2-amino-5-diethylamino-pentane is refluxed for 3 hours. The solution is stirred into ice-water, and the resulting 4,4' - bis - [4 - (5' - diethylamino - pentyl - 2' - amino)- filtered off. Hydrogen chloride is introduced into an ethanolic solution of this product, whereupon the tetrahydrochloride precipitates. It melts at 125° C.

The starting material can be obtained as follows:

A mixture of 31.2 g. of 2-methylthio-4-hydroxy-6-methyl-pyrimidine and 18.9 g. of 4,4'-diamino-diphenylmethane is heated at 180° C. for 3 hours. After cooling, the mass is pulverized and extracted three times by boiling with 150 ml. of ethanol each time, then filtered off with suction. The residue is recrystallized from aqueous dimethyl formamide. The pure 4,4-bis-(4-hydroxy-6-methyl-pyrimidyl-2-amino)-diphenylmethane so obtained melts at 313–315° C.

20.7 g. of this product and 100 ml. of phosphorus oxychloride are treated with 10.5 g. of triethylamine, and stirred, first at room temperature, and then at 120°C. for 3 hours. The excess phosphorus oxychloride is distilled off under reduced pressure, and the residue stirred into ice-water, the 4,4'-bis-(4-chloro-6-methyl-pyrimidyl-2-amino)-diphenylmethane precipitating. It is filtered off with suction, washed with dilute ammonia, water and ethanol, and dried. Melting point, 187–190° C.

Example 25

10.2 g. of 4,4' - bis - (4 - chloro - 6 - methoxymethyl-pyrimidyl-2-amino)-diphenylmethane are treated with 15 ml. of β-diethylamino-ethylamine. The mixture is refluxed for 3 hours, then poured into ice-water, and the solid mass triturated until crystallization sets in. The resulting 4,4' - bis - [4 - (β - diethylamino - ethylamino) - 6-methoxymethyl-pyrimidyl-2-amino]-diphenylmethane of the formula

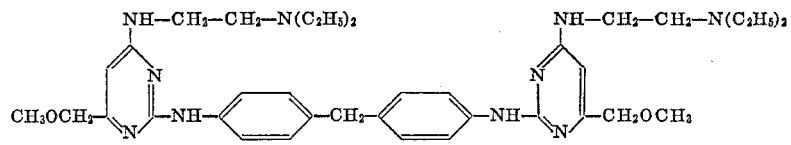

is filtered off and dissolved in ethanol. Hydrogen chloride is introduced into the solution. The resulting tetrahydrochloride is filtered off and recrystallized from ethanol. Melting point, 255–256° C.

The starting material is obtained by refluxing 37.2 g. of 2-methylthio-4-hydroxy-6-methoxymethyl-pyrimidine and 19.8 g. of 4,4'-diamino-diphenylmethane for 3 hours at 180° C. on an oil bath, pulverizing the reaction mass after cooling, extracting it twice by boiling with 150 ml. of ethanol, and filtering hot. The 4,4'-bis-(4-hydroxy-6-methoxymethyl-pyrimidyl-2-amino)-diphenylmethane is recrystallized from aqueous dimethylformamide. Melting point, 283–285° C. 33.6 g. of it are refluxed for 2 hours with 100 ml. of phosphorus oxychloride, dissolution occuring first, and then precipitation. After cooling, the precipitate is washed with petroleum ether. The 4,4'-bis-(4 - chloro - 6 - methoxymethyl-pyrimidyl-2-amino)-diphenyl-methane melts at 155–158° C.

Example 26

A mixture of 10.2 g. of 4,4'-bis-(4-chloro-6-methoxy-methyl-pyrimidyl-2-amino)-diphenylmethane and 15 ml. of 2-amino-5-diethylamino-pentane is heated for 3 hours at 180° C. on an oil bath, then poured into ice-water. The reaction mass solidifies. It is triturated, filtered, washed well with water, then dissolved in ethanol. When hydrogen chloride is introduced into the solution, the tetrahydrochloride of 4,4' - bis-[4-(5'-diethylamino-pentyl-2'-amino) - 6 - methoxy-methyl-pyrimidyl - 2 - amino]-diphenylmethane of the formula

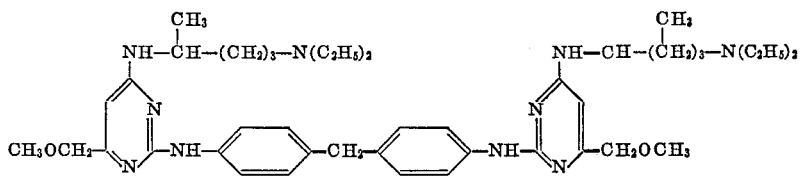

precipitates. It melts and decomposes at 183 to 185° C.

Example 27

20 g. of 4,4'-bis-(4-chloro-6-methoxymethyl-pyrimidyl-2-amino)-diphenyl ether and 30 ml. of β-diethylaminoethylamine are heated together for 3 hours at 150° C. and the solution, while it is still warm, poured into ice-water. The precipitate which forms is filtered off, dissolved in ethanol, and the 4,4'-bis-[4-(β-diethylaminoethylamino)-6-methoxymethyl-pyrimidyl - 2 - amino]-diphenylether-tetrahydrochloride of the formula

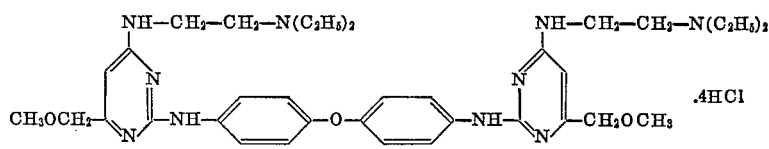

obtained. After being recrystallized from ethanol+ethyl acetate, it melts at 183 to 185° C. (with decomposition).

The starting material is obtained as follows:

A mixture of 37.2 g. of 2-methylthio-4-hydroxy-6-methoxymethyl-pyrimidine and 20 g. of 4,4'-diamino-diphenyl-ether is heated at 180° C. for 3 hours. When the residue has cooled, it is pulverized, extracted twice by boiling with 150 ml. of ethanol, suctioned off while hot, and recrystallized from aqueous dimethyl formamide. The 4,4'-bis-(4 - hydroxy - 6 - methoxy-methyl-pyrimidyl-2-amino)-diphenyl ether melts and decomposes at a temperature of 190° C. upwards. 24 g. of this product are refluxed with 100 ml. of phosphorus oxychloride. After an hour and a half, the phosphorus oxychloride is distilled off, the residue stirred into ice-water, and the 4,4'-bis-(4-chloro - 6 - methoxymethyl-pyrimidyl-2-amino)-diphenyl ether which precipitates filtered off and recrystallized from aqueous dimethyl formamide. Melting point >250° C.

Example 28

10 g. of 4,4'-bis-[4-(β - chloroethylamino)-6-methyl-pyrimidyl-2-amino]-diphenyl-dihydrochloride are heated with 100 ml. of ammoniacal ethanol at 150° C. for 12 hours. After cooling the ethanol is distilled off under vacuum, the residue dissolved in water and the solution treated with active carbon and filtered. To the solution are added 50 ml. of 10% ethanolic hydrochloric acid and the precipitated tetrahydrochloride of the 4,4'-bis-[4-(β-aminoethylamino)-6-methyl - pyrimidyl - 2 - amino]-diphenyl of the formula

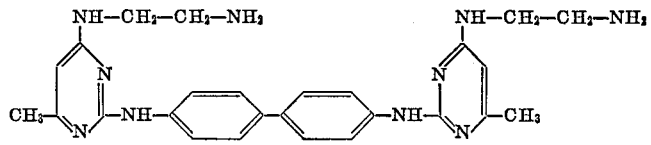

is suctioned off and recrystallized from ethanol of 70% strength. Melting point >310° C.

The starting material is obtained in the following way:

A mixture of 23 g. of 4,4'-bis-[4 - chloro-6-methyl-pyrimidyl-2-amino]-diphenyl and 50 ml. of ethanolamine is refluxed for 4 hours. The excess of the amine is removed by distillation and the residue poured into ice-water with vigorous stirring. The precipitated 4,4'-bis-[4-(β-hydroxyethylamino)-6-methyl-pyrimidyl - 2 - amino]-diphenyl is suctioned off and dried.

10 g. of this product are refluxed together with 50 ml. of thionylchloride for 4 hours, the excess of thionylchloride distilled off completely under vacuum and the remaining 4,4'-bis-[4-(β - chloroethyl-amino)-6-methyl-pyrimidyl-2-amino]-diphenyl is used as it is.

What is claimed is:

1. A compound of the formula

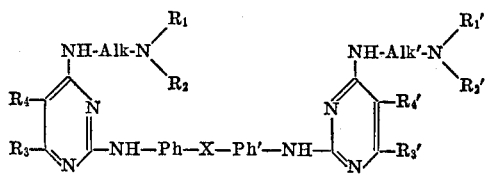

in which Ph and Ph' each represent unsubstituted phenylene and phenylene substituted by a member selected from the group consisting of lower alkyl, lower alkoxy, halogen, trifluoromethyl, hydroxysulfonyl, amino-sulfonyl, nitro and amino, and X is a member selected from the group consisting of a direct bond, oxygen, lower alkylene, lower alkenylene and lower alkylidene, Alk and Alk' represent alkylene radicals having 2–6 carbon atoms, $R_1$ and $R_2$ stand for members selected from the group consisting of lower alkyl, hydrogen and, taken together, lower alkylene having 3 to 7 ring members, oxaalkylene and azaalkylene having 5 to 7 ring members, with the hetero atoms separated by at least one carbon atom, at most one of $R_1$ and $R_2$ being hydrogen, and $R'_1$ and $R'_2$ have the same meanings, respectively, and wherein $R_3$ and $R'_3$ as well as $R_4$ and $R'_4$ each represents a member selected from the group consisting of a hydrogen atom and lower alkyl and lower alkoxy-lower alkyl, and therapeutically acceptable acid addition salts thereof.

2. A compound of the formula

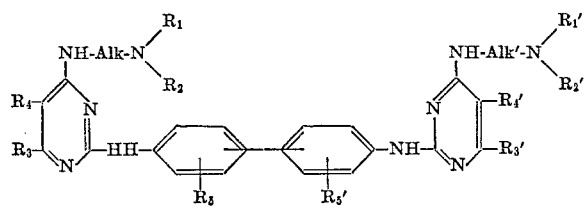

in which Alk, Alk', $R_1$–$R_4$ and $R'_1$–$R'_4$ have the meanings given in claim 1, and $R_5$ and $S'_5$ each represents a member selected from the group consisting of hydrogen, lower alkyl, lower alkoxy and halogen, and acid addition salts thereof.

3. A compound of the formula shown in claim 2, wherein $R_1$–$R_3$, $R'_1$–$R'_3$, $R_5$ and $R'_5$ have the meanings given in claim 2, and $R_4$ and $R'_4$ each represents a hydrogen atom, and therapeutically acceptable acid addition salts thereof.

4. A compound of the formula

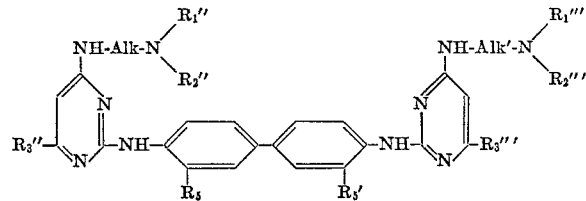

in which Alk and Alk' have the meanings given in claim 1, $R''_1$ and $R'''_1$ each represents a member selected from the group consisting of lower alkyl and hydrogen, and $R''_2$ and $R'''_2$ each represents lower alkyl, $R_5$ and $R'_5$ each stands for a member selected from the group consisting of hydrogen, methyl, methoxy, chlorine and bromine, and $R''_3$ and $R'''_3$ each represents a member selected from the group consisting of hydrogen, methyl, ethyl and propyl, and therapeutically acceptable acid addition salts thereof.

5. A compound of the formula

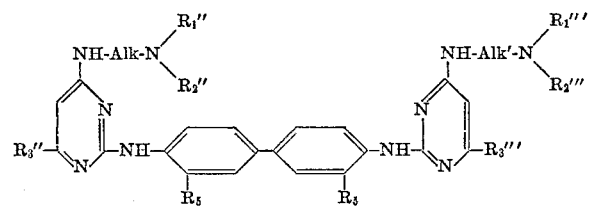

in which Alk and Alk' have the meanings given in claim 1, $R''_1$ and $R'''_1$ each represents a member selected from the group consisting of lower alkyl and hydrogen, and $R''_2$ and $R'''_2$ each represents lower alkyl, $R_5$ and $R'_5$ each stands for a member selected from the group consisting of hydrogen, methyl, methoxy, chlorine and bromine, and $R''_3$ and $R'''_3$ each stands for a lower alkoxyalkyl radical, and therapeutically acceptable acid addition salts thereof.

6. The 4,4' - bis-[4-($\beta$-diethylamino-ethylamino)-6-methyl-pyrimidyl-2-amino]-diphenyl of the formula

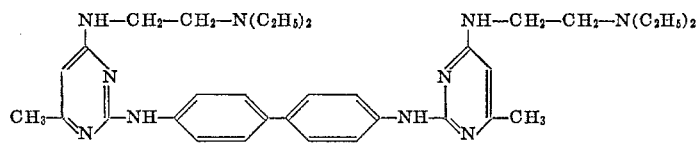

and therapeutically acceptable acid addition salts thereof.

7. The 4,4' - bis-[4-($\beta$-diethylamino-ethylamino)-6-methyl-pyrimidyl-2-amino]-3,3'-dimethoxy-diphenyl, and therapeutically acceptable acid addition salts thereof.

8. The 4,4' - bis-[4-($\beta$-diethylamino-ethylamino)-6-methyl - pyrimidyl-2-amino]-3,3'-dimethyl-diphenyl, and therapeutically acceptable acid addition salts thereof.

9. The 4,4' - bis-[4-($\gamma$-dimethylamino-propylamino)-6-methyl-pyrimidyl-2-amino]-diphenyl, and therapeutically acceptable acid addition salts thereof.

10. 4,4' - bis - [4 - ($\delta$ - diethylamino-$\alpha$-methyl-n-butylamino) - 6 - methyl-pyrimidyl-2-amino]-diphenyl, and therapeutically acceptable acid addition salts thereof.

11. The 4,4' - bis - [4-($\beta$-methylamino-ethylamine)-6-methyl-pyrimidyl-2-amino]-diphenyl, and therapeutically acceptable acid addition salts thereof.

12. The 4,4' - bis - [4-($\beta$-dimethylamino-ethylamino)-6-methyl-pyrimidyl-2-amino]-diphenyl, and therapeutically acceptable acid addition salts.

13. The 4,4' - bis - [4-($\beta$-diethylamino-ethylamino)-pyrimidyl-2-amino]-diphenyl, and therapeutically acceptable acid addition salts thereof.

14. The 4,4' - bis - [4-(5'-diethylamino-pentyl-2'-amino)-6-methyl-pyrimidyl-2-amino]-diphenylmethane, and therapeutically acceptable acid addition salts thereof.

15. The 4,4' - bis - [4-(5'-diethylamino-pentyl-2'-amino) - 6 - methoxymethyl - pyrimidyl-2-amino]-diphenylmethane, and therapeutically acceptable acid addition salts thereof.

16. The tetrahydrochloride of 4,4'-bis-[4-($\beta$-diethylamino - ethylamino) - 6 - methyl-pyrimidyl-2-amino]-diphenyl.

17. The tetrahydrochloride of 4,4'-bis-[4-($\beta$-diethylamino - ethylamino) - 6 - methyl-pyrimidyl-2-amino]-3,3'-dimethoxy-diphenyl.

18. The tetrahydrochloride of 4,4'-bis-[4-($\beta$-diethylamino - ethylamino) - pyrimidyl-2-amino]-diphenyl.

19. A compound of the formula

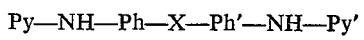
Py—NH—Ph—X—Ph′—NH—Py′ in which Py and Py′ each represents a pyrimidyl-(2) radical containing in 4-position a member selected from the group consisting of a hydroxyl group, a free mercapto group a lower alkyl mercapto group, a phenyl-lower alkyl mercapto group and a halogen atom, Ph and Ph′ each stands for unsubstituted phenylene and phenylene substituted by a member selected from the group consisting of lower alkyl, lower alkoxy, halogen, trifluoromethyl, hydroxysulfonyl, aminosulfonyl, nitro and amino, and X represents a member selected from the group consisting of a direct bond, oxygen, lower alkylene, lower alkenylene and lower alkylidene.

20. A compound of the formula

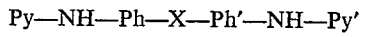
Py—NH—Ph—X—Ph′—NH—Py′ in which Py represents a pyrimidyl-(2) radical containing in 4-position an amino group substituted by an aliphatic radical which carries an amino group and has more than one carbon atom between the N-atoms, Py′ stands for a pyrimidyl-(2) radical which contains in 4-position a member selected from the group consisting of a hydroxy group, a free mercapto group, a lower alkyl mercapto group, a phenyl-lower alkyl mercapto group and a halogen atom, Ph and Ph′ each stands for unsubstituted phenylene and phenylene substituted by a member selected from the group consisting of lower alkyl, lower alkoxy, halogen, trifluoromethyl, hydroxysulfonyl, aminosulfonyl, nitro and amino, and X represents a member selected from the group consisting of lower alkyl, lower alkoxy, halogen, lower alkenylene and lower alkylidene.

References Cited

UNITED STATES PATENTS 3,058,989  10/1962  Buell et al. _____ 260—256.4

FOREIGN PATENTS 1,048,179  7/1953  France.

ALEX MAZEL, *Primary Examiner.*

R. J. GALLAGHER, *Assistant Examiner.*

U.S. Cl. X.R.

260—256.5; 424—251

PO-1050
(5/69)

UNITED STATES PATENT OFFICE
CERTIFICATE OF CORRECTION

Patent No. 3,445,467  Dated May 20, 1969

Inventor(s) ALBRECHT HUENI ET AL

It is certified that error appears in the above-identified patent and that said Letters Patent are hereby corrected as shown below:

Column 23, claim 2, line 2 after the formula, "$S'_5$" should read -- $R'_5$ -- .

Column 25, claim 19, line 4 after the formula, after "group" insert -- , -- .

Column 26, lines 8, 9 and 10, that portion reading "and X represents a member selected from the group consisting of lower alkyl, lower alkoxy, halogen, lower alkenylene and lower alkylidene" should read -- and X represents a member selected from the group consisting of a direct bond, oxygen, lower alkylen lower alkenylene and lower alkylidene -- .

SIGNED AND
SEALED
MAY 5 1970

(SEAL)
Attest:

Edward M. Fletcher, Jr.
Attesting Officer

WILLIAM E. SCHUYLER, JR.
Commissioner of Patents